United States Patent [19]
Ogino et al.

[11] Patent Number: 5,890,089
[45] Date of Patent: Mar. 30, 1999

[54] NAVIGATION SYSTEM

[75] Inventors: Toshikazu Ogino; Eiki Hosaka; Hideo Yajima, all of Kanagawa, Japan

[73] Assignee: Mitsumi Electric Co., Ltd., Tokyo, Japan

[21] Appl. No.: 771,904

[22] Filed: Dec. 23, 1996

[30] Foreign Application Priority Data

Dec. 28, 1995 [JP] Japan ................................... 7-354220

[51] Int. Cl.$^6$ .................................................. G06F 165/00
[52] U.S. Cl. .................... 701/211; 701/207; 340/990; 340/995
[58] Field of Search .................................. 701/200, 207, 701/208, 211, 213; 73/178 R; 340/988, 990, 995

[56] References Cited

U.S. PATENT DOCUMENTS

| | | | |
|---|---|---|---|
| 5,184,123 | 2/1993 | Bremer et al. | 701/211 |
| 5,414,630 | 5/1995 | Oshizawa et al. | 701/211 |
| 5,654,892 | 8/1997 | Fujii et al. | 701/211 |
| 5,729,109 | 3/1998 | Kaneko et al. | 701/211 |
| 5,736,941 | 4/1998 | Schulte et al. | 701/211 |
| 5,737,225 | 4/1998 | Schulte | 701/211 |
| 5,739,773 | 4/1998 | Morimoto et al. | 701/211 |
| 5,774,071 | 6/1998 | Konishi et al. | 701/211 |

FOREIGN PATENT DOCUMENTS

| | | |
|---|---|---|
| 4-74986 | 3/1992 | Japan . |
| 4-76479 | 3/1992 | Japan . |
| 4-110787 | 4/1992 | Japan . |
| 4-115116 | 4/1992 | Japan . |
| 4-121619 | 4/1992 | Japan . |
| 07146154A | 6/1995 | Japan . |

*Primary Examiner*—Gary Chin
*Attorney, Agent, or Firm*—Whitham, Curtis & Whitham

[57] ABSTRACT

A navigation system comprises: an antenna 12 which receives radio waves from a GPS satellite; a controller 15 which perform various operations to detect the present position of the car from the output signal of the antenna 12; and an image display 17 which, being controlled by the controller, displays a map, the present position of the car, etc., and a traveling-direction indicator 30 which includes a sign section made up of arrow marks or triangular marks to indicate a direction in which the car should move on. With the system, as the car comes near a branching guide point such as a crossing, the controller 15 operates to cause the sign section of the traveling-section indicator 30 to turn on or flicker to indicate a direction in which the car should move one.

4 Claims, 4 Drawing Sheets

NAVIGATION SYSTEM

BACKGROUND OF THE INVENTION

1. Field of the Invention

This invention relates to a car navigation system which determines the present position of the car from a radio wave signal from a GPS satellite, and leads the car to a predetermined destination, and more particularly to a car navigation system which is suitably mounted on a car.

2. Related Art

In general, a car navigation system comprises: an antenna for receiving a radio wave signal from a GPS satellite; a controller which performs various operations to determine the present position of a car according to the signal received by the antenna and to lead the car to a predetermined destination; and an image display (or a monitor such as a liquid crystal display) which is controlled by the controller to display a map and the present position of the car.

A car navigation system of this type has a route setting function to automatically setting a route to a destination. Where this route setting function is used, a route to a destination is indicated on a map displayed on the monitor, and the present position and the direction in which the car should move are indicated with marks such as arrow marks, and when the car comes near a branching guide point such as a crossing, a simple map is displayed on a large scale to show the area around the branching guide point in detail, and in addition, a vocal guide announcement is made—for instance "Car is coming near the guide point", "Turn right at the next corner", "The next relay point is on the left side".

However, the conventional car navigation system suffers from the following problems:

(1) In general, the antenna is mounted on the roof of the car, and the controller and the monitor (display) are mounted on the arm rest beside the driver's seat or on the instrument panel so that they may not come in the front field of vision of the driver operating the car. The monitor is relatively small in size. Hence, during the day time when it is light outside the car, it is rather difficult for the driver to see a picture displayed on the monitor (especially in the case where a liquid crystal display is employed as the monitor). Sometimes, the driver cannot read the contents displayed, and even a fellow passenger cannot read the contents.

(2) In some of the navigation systems, a TV tuner is built in the controller or the monitor. When television is watched by using the monitor, it goes without saying that no navigation guide is displayed on the monitor.

(3) Reading the picture (such as the position of the car, and the direction of traveling) displayed, especially to watch the monitor for a while which is difficult to see, may result in an accident because, in this case, the driver takes his eyes off the road because of the position of the monitor. Hence, even when the car comes near, for instance, a crossing where the car is to be turned right or left, the driver operating the car cannot read the indication on the monitor except when a fellow passenger is in the car. This is inconvenient for the driver.

(4) In the case when the driver and a fellow passenger or passengers are talking to each other, or when an audio set is in operation, it is difficult for the driver to hear the vocal guide announcement. In addition, the vocal guide announcement is made only two or three times. Hence, if the driver misses it, then there is no other way for the driver to be alerted. That is, the vocal guide announcement is lower in certainty and in reliability than the visual recognition through display on a monitor.

SUMMARY OF THE INVENTION

In view of the foregoing, an object of the invention is to provide a navigation system which, as the car comes near a branching guide point such as a crossing, accurately visually outputs instructions or indications on data such as course change without forcing the driver to read them on the image display.

The foregoing object of the invention has been achieved by the provision of a navigation system comprising: an antenna which receives radio waves from a GPS satellite; a controller which perform various operations to detect the present position of a car from an output signal of the antenna; and an image display which, being controlled by the controller, displays a map and the present position of the car, in which, according to the invention, in addition to the image display, a traveling-direction indicator is provided which includes a sign section which is adapted to indicate a direction in which the car should move or a display section adapted to display the direction, and as the car comes near a branching guide point such as a crossing, the controller operates to cause the sign section or display section of the traveling-section indicator to turn on or flicker to indicate a direction in which the car should move.

Preferably, in the navigation system, the controller operates to change the operating state of the sign section or display section of the traveling-direction indicator according to a distance between the present position of the car and a branching guide point such as a crossing.

The sign section of the traveling-direction indicator may be operated in various manners as follows. As was described above, the sign section is merely turned on. Alternatively, according to the distance between the present position of the car and the branching guide point such as a crossing, the intensity of light or the color of light is changed (a lighting operation), or the flickering speed (or flickering frequency) is changed, or a number of light sources are successively lighted on while the speed of lighting on them is changed. On the other hand, the display section may be also operated in various manners. For instance in the case where the display section is made up of a liquid crystal display, arrow marks or triangular marks pointing a direction in which the car should be moved on are displayed, and as the case may be those direction pointing marks may be so designed that the above-described various operations are effected with them similarly as in the case of the sign section.

More preferably, in the navigation system, the sign section of the traveling-direction indicator comprises a left-turn indicating section, a straight-movement indicating section, and a right-turn indicating section, and the controllers operates to change the speed of flicking of one selected from a group consisting of the left-turn indicating section, the straight-movement indicating section, and the right-turn indicating section according to a distance between the present position of the car and a branching guide point such as a crossing; or the sign section of the traveling-direction indicator comprises a group of radially extended arrow marks which are: a right-turn indicating arrow mark and a left-turn indicating arrow mark which are arranged on one straight line; a straight-movement indicating arrow mark which is perpendicular to the right-turn indicating arrow mark and the left turn indicating arrow mark; and intermediate-direction indicating arrow marks which are arranged between the right-turn indicating arrow mark and the straight-movement indicating arrow mark and between the left-turn indicating arrow mark and the straight-movement indicating arrow mark.

In the navigation system thus designed, the traveling-direction indicator provided in addition to the image display is set on the lower portion of the front panel in front of the driver's seat so that the driver can see it with ease. In this case, the traveling-direction indicator merely has a direction-indicating sign section made up of arrow marks or the like. Hence, the traveling-direction indicator is considerably small in size, thus not interfering with the field of vision of the driver.

As the car comes near a branching guide point such as a crossing, the lighting operation, the flickering operation, or the indicating operation is carried out to indicate the direction in which the car should move. Hence, in this case, the driver can visually confirm the direction in which the car should move, without watching the image display, that is, without taking his eye off the road continuously (or frequently).

Thus, as the car comes near a branching guide point such as a crossing, the navigation system accurately visually outputs instructions or indications on data such as course change without forcing the drive to recognize them on the image display. Thus, the navigation system of the invention is high in safety and in reliability.

In addition, the traveling-direction indicator serves as a simple navigator. Hence, as the case may be, it is unnecessary for the image display to display a map, and television can be enjoyed with the image display.

BRIEF DESCRIPTION OF THE DRAWINGS

FIG. 3 (C) is a sectional view taken along the line C—C in FIG. 2; and

DETAILED DESCRIPTION OF THE PREFERRED EMBODIMENTS

A navigation system according to the invention will be described with reference to the accompanying drawings.

Figure 1:
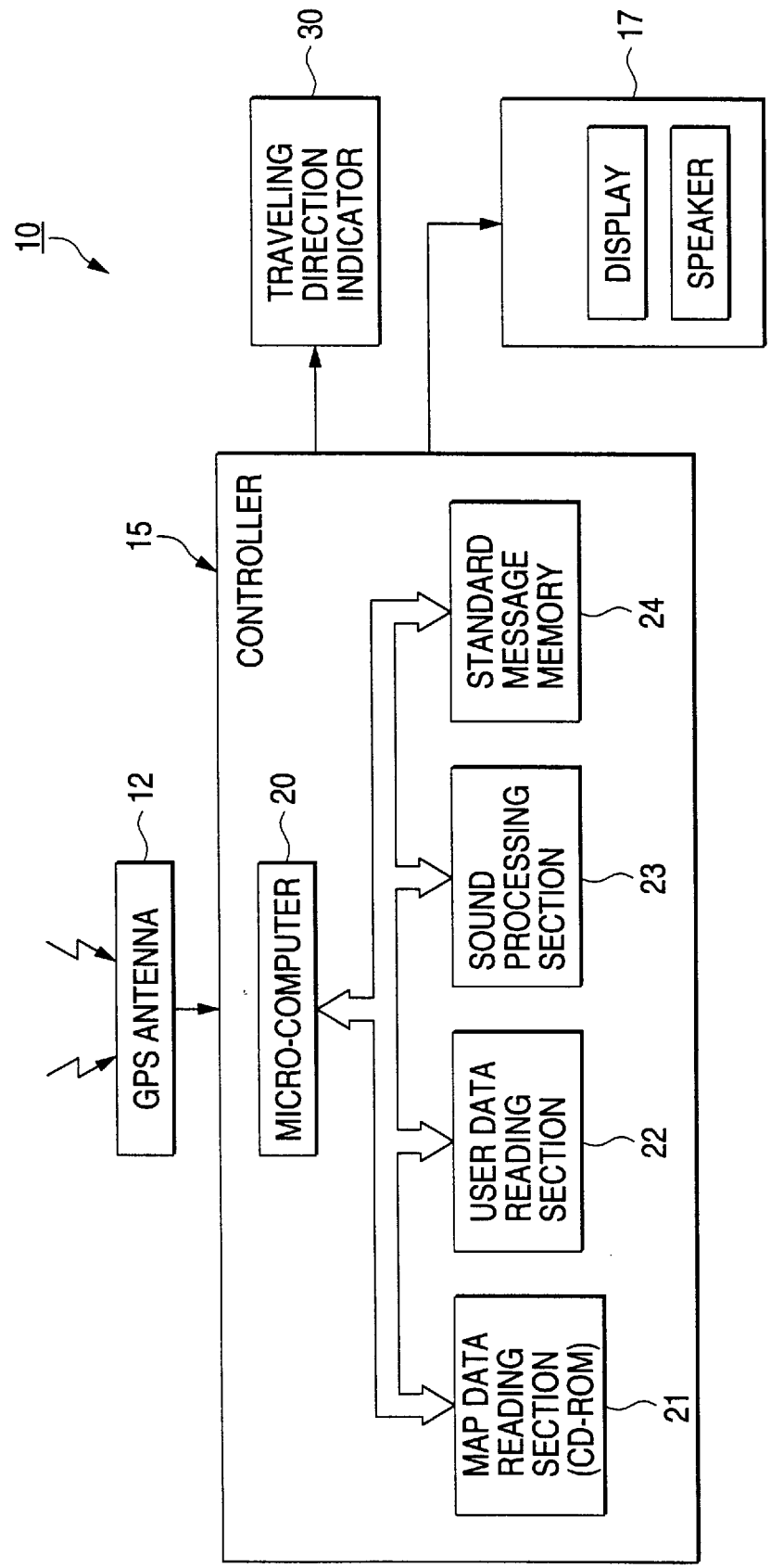
FIG. 1 is a block diagram showing the arrangement of an example of a navigation system according to the invention.

FIG. 1 is a block diagram showing the arrangement of the navigation system of the invention. In FIG. 1, reference numeral 10 designates the navigation system. The system 10 comprises: an antenna 12 which is mounted on the roof of a car, to receive radio waves from a GPS satellite; a controller 15 incorporating a micro-computer 20 which operates to detect the present position of a car from a signal received by the antenna and leads the car to a predetermined destination; an image display 17 (a monitor made of up a liquid crystal display) which is controlled by the controller 15 to display a map and the present position of a car; and a traveling direction indicator 30 in which a specific feature of the invention resides.

The micro-computer 20 built in the controller 15 is connected through a bus bar to a map data reading section 21 made up of a CD-ROM player, a user data reading section 22, a sound processing section 23, and a standard message memory 24. These circuit elements are substantially the same as those in a conventional navigation system.

Figure 2:
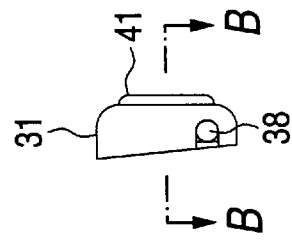
FIG. 2 (A), (B) AND (C) are a plan view, a front view, and a left side view of a traveling-direction indicator in the navigation system shown in FIG. 1, respectively FIG. 3 (A) is a sectional view taken along the line A—A in FIG. 2.
Figure 2:
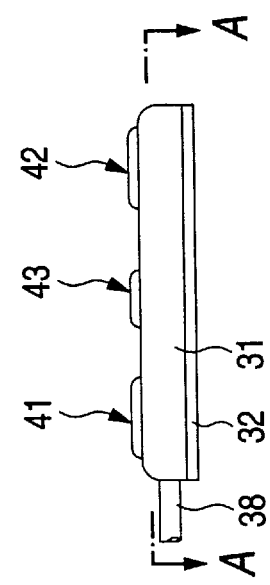
Figure 2:
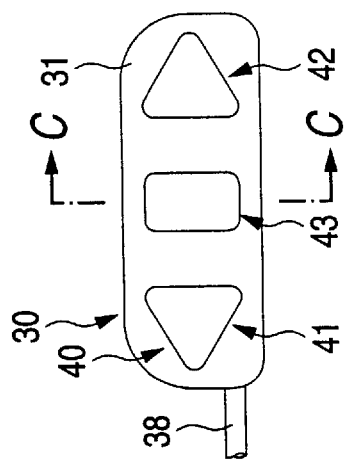
Figure 3:
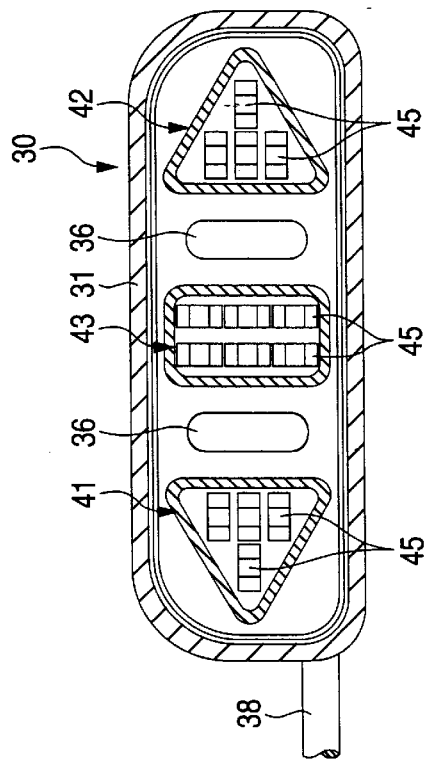
FIG. 3 (B) is a sectional view taken along the line B—B in FIG. 2.
Figure 3:
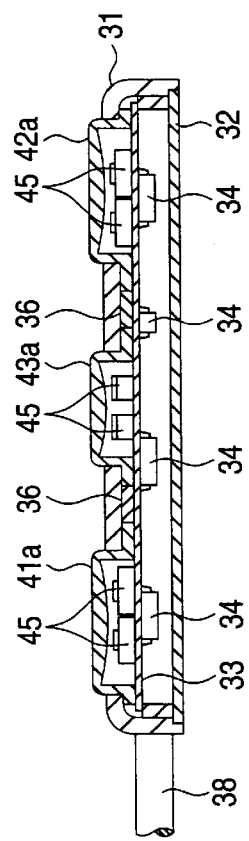
Figure 3:
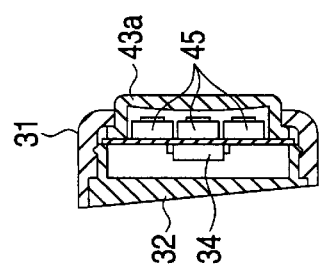

The traveling direction indicator 30 connected through a cable 38 to the controller 15 is as shown in FIGS. 2 and 3. That is, the indicator 30 is in the form of a plate or a thin rectangular box having an upper casing 31 and a lower casing 32, and it is 20 to 30 mm in width, 60 to 80 mm in length, and 5 to 15 mm in thickness. On the outer surface of the upper casing 31, a sign section 40 is provided. More specifically, at the left portion of the outer surface of the upper casing 31, a left-turn indicating section 41 is provided which has a translucent sign cover 41a which is in the form of a triangle pointing left; and at the middle portion of the outer surface of the upper casing, a straight-movement indicating section 43 is provided which has a translucent rectangular cover 43a; and at the right portion of the outer surface of the upper casing 31, a right-turn indicating section 42 is provided which has a translucent sign cover 42a which is in the form of a triangle pointing right.

A wiring board 33 is provided inside the traveling direction indicator 30 comprising the upper and lower casing 31 and 32. Electronic components 34 are mounted on the lower surface of the wire board 33. And predetermined numbers of LED lamps 45 are mounted on the upper surface of the wire board 33 at the left, middle and right portions, to turn on the above-described left-turn indicating section 41, the straight-movement indicating section 43, and right-turn indicating section 42, respectively.

More specifically, in the left-turn indicating section, four LED lamps 45 are arranged in triangular fashion to point left, and in the right-turn indicating section, too, four LED lamps 45 are arranged in triangular fashion to point right. In the straight-movement indicating section 43, six LED lamps are arranged in two parallel lines—three in each line.

A partition board 36 is provided on the wiring board 33 between the left-turn indicating section 41 and the straight-movement indicating section 43 to isolate the output light beams of the LED lamps in the sections 41 and 43 from each other. In addition, another partition board 36 is provided on the wiring board 33 between the right-turn indicating section 42 and the straight-movement indicating section 43 to isolate the output light beams of the LED lamps in the sections 42 and 43 from each other.

The on-off control of the LED lamps 45 in the left-turn indicating section 41, the straight-movement indicating section 43, and the right-turn indicating section 42 is carried out in conjunction with a route setting function of the controller 15.

That is, as the car comes near a branching guide point such as a crossing, the controller 15 operates to cause one of the group consisting of the left-turn indicating section 41, the straight-movement indicating section 43, and the right-turn indicating section 42 forming the sign section 40 of the traveling-direction indicator 30 to flicker to indicate a direction in which the car should be moved on. In this case, as the distance between the branching guide point and the car is decreased, the controller 15 operates to flicker the LED lamps in a suitable one of the indicating sections 41, 43 and 42 and increases the flickering speed (or the flickering frequency) thereof.

In the navigation system 10 thus designed, the traveling-direction indicator 30 provided in addition to the image display 17 is set at a suitable position in front of the driver's seat so that the driver can readily see it—for instance it is installed on the lower portion of the front panel. In this case, the traveling-direction indicator 30, being small in size, will never interfere with the field of vision of the driver.

And as the car comes near a branching guide point such as a crossing, the LED lamps in a selected one of the group consisting of the left-turn indicating section 41, the straight-movement indicating section 43, and the right-turn indicating section 42 are flickered, and the flickering speed (or the flickering frequency) is increased. Hence, in this case, unlike the case where a direction in which the car should moved is indicated vocally, the driver can visually confirm the direction without watching the image display 17, that is, without taking his eyes off the road continuously (or frequently).

Thus, as the car comes near a branching guide point such as a crossing, the navigation system accurately visually outputs instructions or indications on data such as course change without forcing the driver to watch the image display. Thus, the navigation system of the invention is high in safety and in reliability.

In addition, the traveling-direction indicator 30 serves as a simple navigator. Hence, as the case may be, it is unnecessary for the image display to display a map, and television can be enjoyed with the image display.

The design of the traveling-direction indicator 30 is not limited to the one which has been described above. That is, in the above-described indicator 30, the right-turn indicating section 42 and the left-turn indicating section 41 are triangular, and the straight-movement indicating section 43 is rectangular; however, it goes without saying that they may be each in the form of an arrow indicating a direction in which the car should move.

Figure 4:
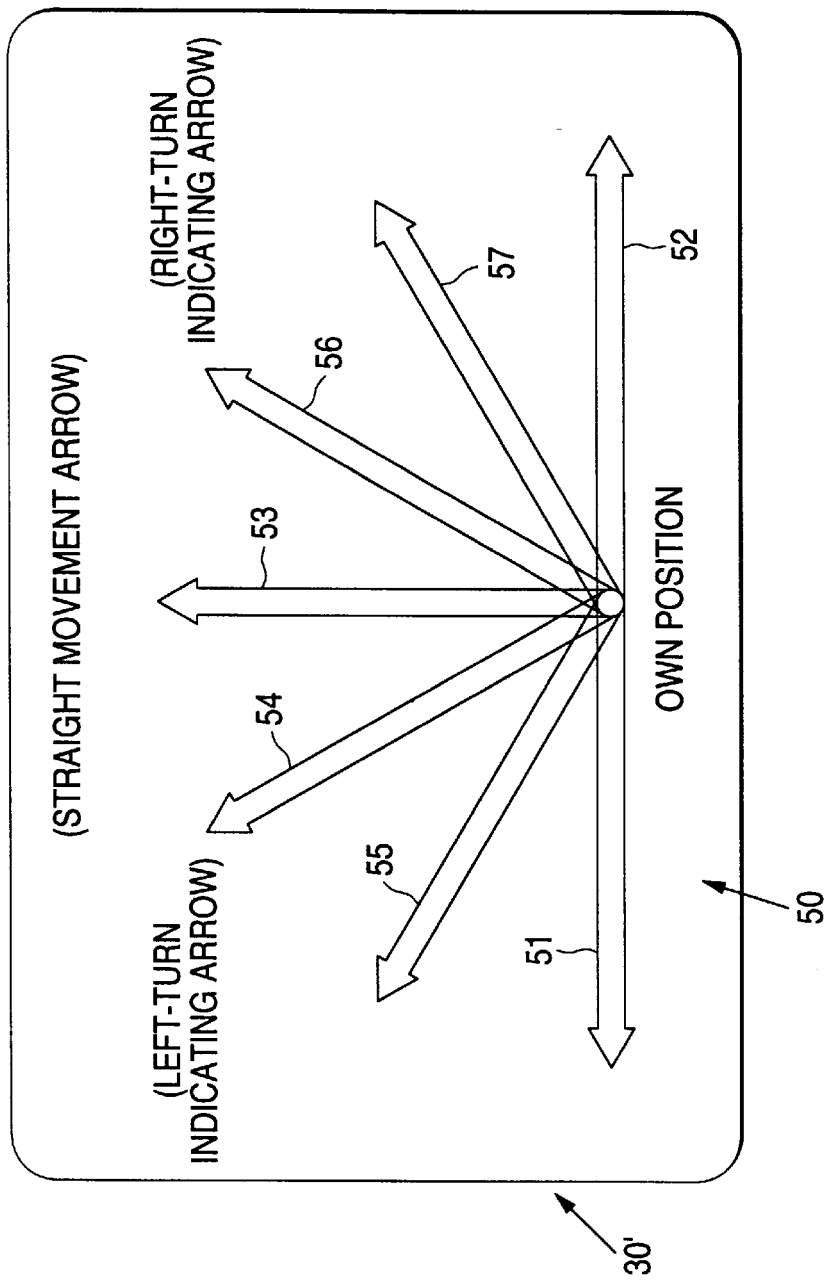
FIG. 4 is a diagram showing one modification of the traveling-direction indicator.

The above-described traveling-direction indicator or sign section may be modified as shown in FIG. 4. That is, a traveling-direction indicator 30' has a sign section 50 which comprises: radially extended arrow marks, namely a left-turn indicating arrow mark 51 and a right-turn indicating arrow mark 51 which are on one straight line; a straight-movement indicating arrow mark 53 which is perpendicular to the arrow marks 51 and 53; intermediate-direction indicating arrow marks 54 and 55 provided at equal angular intervals of 30° between the left-turn indicating arrow mark 51 and the straight-movement indicating arrow mark 53; and intermediate-direction indicating arrow marks 56 and 57 provided at equal annular intervals of 30° between the right-turn indicating arrow mark 52 and the straight-movement indicating arrow mark. As the car comes near a branching guide point such as a crossing, the controller 15 operates to turn on or flicker the intermediate-direction indicating arrow marks on the side to which the course of the car should be changed (the intermediate-direction indicating arrow marks 54 and 55 in the case of the left turn, and the intermediate-direction indicating arrow marks 56 and 57 in the case of the right turn); and when the car further approaches the branching guide point, the left-turn indicating arrow mark 51 or the right-turn indicating arrow marks 52 on the side to which the course of the car should be changed is turned on or flickered.

As is apparent from the above description, in the navigation system thus designed, the traveling-direction indicator provided in addition to the image display is so positioned that the driver can see it with ease and the traveling-direction indicator will not interfere with the field of vision of the driver operating the car.

As the car comes near a branching guide point such as a crossing, the sign section or the display section of the traveling-direction indicator performs the lighting operation, the flickering operation, or the indicating operation to indicate the direction in which the car should move on. Hence, in this case, the driver can visually confirm a direction in which the car should moved on without watching the image display, that is, without taking his eyes off the road continuously (or frequently).

Thus, as the car comes near a branching guide point such as a crossing, the navigation system accurately visually outputs instructions or indications on data such as course change without forcing the driver to watch the image display. Thus, the navigation system of the invention is high in safety and in reliability.

In addition, the traveling-direction indicator 30 serves as a simple navigator. Hence, as the case may be, it is unnecessary for the image display to display a map, and therefore television can be enjoyed with the image display.

Although the invention herein has been described with the references to particular embodiments, it is to be understood that the embodiment are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A navigation system for a car comprising:
   an antenna mounted on the car for receiving radio waves from a GPS satellite;
   a controller performing various operations to detect a present position of the car from an output signal of said antenna; and
   a traveling-direction indicator mounted in front of a driver of the car and including a sign section which is adapted to indicate the direction in which said car should move, said traveling-direction indicator being visible to the driver while viewing the road,
   wherein when said car comes near a crossing, said controller operates to cause said sign section of said traveling-section indicator to indicate said direction in which said car should move so as to visually output instructions to the driver of the car an upcoming change in direction, and
   wherein said controller operates to change the operating state of said sign section of said traveling-direction indicator by flickering said sign section at a rate inversely proportional to a distance between the present position of said car and said crossing so as to visually indicate to the driver of the car an approximate distance of an instructed change in direction.

2. A navigation system as claimed in claim 1, wherein said sign section of said traveling-direction indicator includes a left-turn indicating section, a straight-movement indicating section, and a right-turn indicating section, and said controller operates to change the rate of said flickering of one selected from a group consisting of said left-turn indicating section, said straight-movement indicating section, and said right-turn indicating section according to said distance between the present position of said car and said crossing.

3. A navigation system as claimed in claim 1, wherein said sign section of said traveling-direction indicator includes a group of radially extended arrow marks having:

a right-turn indicating arrow mark and a left-turn indicating arrow mark which are arranged on one straight line;

a straight-movement indicating arrow mark which is perpendicular to said right-turn indicating arrow mark and said left turn indicating arrow mark; and intermediate-direction indicating arrow marks which are arranged between said right-turn indicating arrow mark and said straight-movement indicating arrow mark and between said left-turn indicating arrow mark and said straight-movement indicating arrow mark.

4. A navigation system as claimed in claim 1, further comprising:

an image display, controlled by said controller, for displaying a map and the present position of said car.

* * * * *